United States Patent
Miller

(10) Patent No.: US 8,393,571 B2
(45) Date of Patent: Mar. 12, 2013

(54) HYDRAULIC FLUID CONTROL APPARATUS

(75) Inventor: Richard John Miller, Coventry (GB)

(73) Assignee: Meggitt Aerospace Limited (GB)

( * ) Notice: Subject to any disclaimer, the term of this patent is extended or adjusted under 35 U.S.C. 154(b) by 0 days.

(21) Appl. No.: 13/480,556

(22) Filed: May 25, 2012

(65) Prior Publication Data

US 2012/0286564 A1 Nov. 15, 2012

Related U.S. Application Data

(63) Continuation of application No. 11/568,822, filed on Apr. 24, 2007, now Pat. No. 8,205,830.

(51) Int. Cl.
*B64C 25/42* (2006.01)

(52) U.S. Cl. .......... 244/110 A; 244/103 R; 303/155

(58) Field of Classification Search ........ 244/100 R, 244/103 R, 102 R, 102 A, 110 R, 111, 110 A, 244/110 H, 235; 303/126, 155
See application file for complete search history.

(56) References Cited

U.S. PATENT DOCUMENTS

| | | | | |
|---|---|---|---|---|
| 3,948,569 A | * | 4/1976 | Gentet et al. | 303/159 |
| 4,043,607 A | * | 8/1977 | Signorelli et al. | 303/112 |
| 4,412,291 A | * | 10/1983 | Amberg et al. | 701/78 |
| 4,457,967 A | * | 7/1984 | Chareire et al. | 428/212 |
| 4,610,484 A | * | 9/1986 | Amberg et al. | 303/113.4 |
| 4,775,195 A | * | 10/1988 | Miller | 303/122.07 |
| 4,822,113 A | * | 4/1989 | Amberg et al. | 303/191 |
| 5,081,297 A | * | 1/1992 | Lebel et al. | 710/104 |
| 5,180,214 A | * | 1/1993 | Yeh et al. | 303/168 |

* cited by examiner

*Primary Examiner* — Tien Dinh
*Assistant Examiner* — Michael Kreiner
(74) *Attorney, Agent, or Firm* — Renner, Kenner, Greive, Bobak, Taylor & Weber

(57) ABSTRACT

Upgrading existing aircraft braking systems to accommodate replacement of existing brake units employing sintered friction materials with brake units employing carbon-carbon composite friction materials is often desirable. However, when upgrading the braking systems it is necessary to ensure that the integrity of the existing airframe is not compromised by the use of the new brake assemblies employing the carbon-carbon composite friction materials. Consequently, the present invention replaces existing pressure control valves of existing braking systems with an electronic control unit (126) coupled to a pressure control servovalve (128), thereby ensuring proper application of hydraulic pressure to brake assemblies (122). An advantage of this invention is that the pressure profile of the hydraulic fluid is controllable and hence the integrity of the airframe is maintained.

15 Claims, 3 Drawing Sheets

HYDRAULIC FLUID CONTROL APPARATUS

Figure 1A:
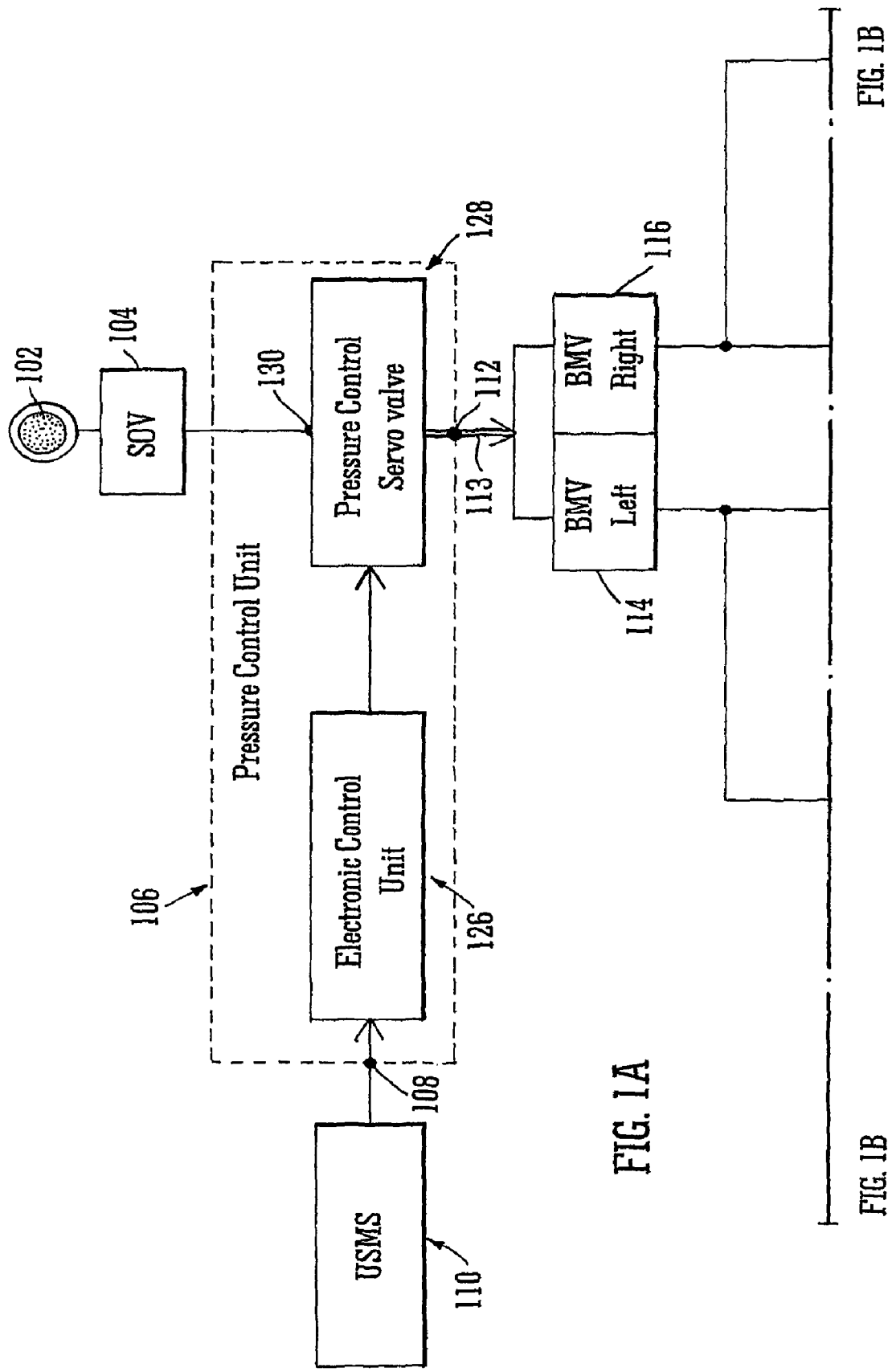

This is a continuation of Application Ser. No. 11/568,822, filed Apr. 24, 2007, now U.S. Pat. No. 8,205,830.

The present invention relates to a hydraulic fluid control apparatus of the type used, for example, in a braking system for an aircraft.

The high cost of aircraft development means that development programs for new aircraft need high production numbers and/or selling price to justify investment levels required. In the aviation industry, there are many niche applications for small numbers of aircraft, making investment in a new aircraft difficult to justify. However, aging aircraft that currently fill many of these niche functions are operating with equipment that can be obsolete or inefficient, because of the outdated technology employed. Such equipment can include engines and ancillary equipment, avionics, landing gear and control systems.

An increasing trend in aviation is the updating of proven airframe designs with modern equipment to provide an updated, more efficient aircraft that utilises current technology without the cost associated with development of a completely new aircraft. Some older airframes that are now being refurbished and re-equipped for a new life span were originally designed for braking systems employing sintered friction materials. These aircraft are now being equipped with modern braking systems. An example of such an aircraft is the Nimrod MRA4 built by BAE Systems Limited of Great Britain. However, one drawback of this approach is the accommodation of the performance parameters of new modern systems by the existing airframe, in particular the torque generated by a braking system.

In this respect, the modern aircraft braking systems are designed around the use of carbon-carbon composite friction materials that have a significantly higher peak torque during a braking cycle than sintered materials. Consequently, if the brake torque builds too quickly and/or exceeds certain threshold values when the brake is applied, it is possible to cause damage to the airframe.

Brake control on aircraft employing such airframes refurbished with braking systems using carbon-carbon composite friction materials has been carried out by the use of complex systems within hydro-mechanical brake pressure control valves to control brake torque and avoid damage to the airframe. Typically, a pressure reducing valve, under the control of a utilities systems management system, feeds hydraulic fluid under pressure to brake metering valves, anti-skid valves and hydraulic fuses downstream of the pressure reducing valve. The pressure reducing valve builds a pressure profile in response to a brake signal received by the pressure reducing valve, the pressure to the brakes being increased over a pre-determined time from a starting pressure to some peak value during braking until the pressure is then released after the required brake application has been completed. The functionality of the pressure reducing valve is provided mechanically by, for example, the use of a restrictor to limit the flow of hydraulic fluid and an accumulator, a build-up of pressure being dependent on the restrictor size and accumulator volume.

According to a first aspect of the present invention a hydraulic fluid control apparatus for replacing a pressure reducing valve of a braking system, the apparatus comprising: a processing unit for receiving an input signal and generating an electrical control signal in response thereto; and means for variably controlling a hydraulic output in response to the electrical control signal, the means for variably controlling the hydraulic output being coupled to the processing unit.

Preferably, the first control signal corresponds to a demand, when in use, for braking. More preferably, the processing unit is arranged to generate the control signal within predetermined parameters irrespective of the input signal corresponding to the demand for braking.

Preferably, the control signal is configurable.

The processing unit and/or the means for variably controlling the hydraulic output may be powered by the input signal.

The means for variably controlling the hydraulic output may be a servovalve. The means for variably controlling the hydraulic output may be arranged to control, when in use, hydraulic pressure and/or hydraulic flow.

According to a second aspect of the present invention, there is provided a braking control system comprising the hydraulic fluid control apparatus as set forth above in relation to the first aspect of the invention.

According to a third aspect of the present invention, there is provided a vehicle comprising the hydraulic fluid control apparatus as set forth above in relation to the first aspect of the invention.

According to a fourth aspect of the present invention, there is provided an aircraft comprising the hydraulic fluid control apparatus as set forth above in relation to the first aspect of the invention.

According to a fifth aspect of the present invention, there is provided a method of upgrading a braking system, the method comprising the steps of: fluidly coupling between a source of hydraulic fluid under pressure and a braking assembly a means for variably controlling a hydraulic output in response to an electrical control signal, the means for variably controlling the fluid output being provided in place of a pressure reducing valve; providing a processing unit for receiving, when in use, an input signal and generating the electrical control signal in response thereto, and coupling the processing, unit to the means for variably controlling the hydraulic output; wherein the processing unit is arranged to control, when in use, supply from the means for variably controlling the hydraulic output in response to the control signal.

It is thus possible to provide a hydraulic fluid control apparatus having reduced complexity of mechanical components, whilst delivering a required progressive increase in pressure up to a defined maximum pressure. Additionally, by generating a progressive increase in pressure and maximum pressure limit that overrides a rate of brake demand called by a pilot of an aircraft within limits that are calculated to be acceptable to an airframe, improved safety is achieved. A further benefit of the above apparatus is additional flexibility to be able to adjust a characteristic ramp rate by reselection of electronic components and/or reprogramming of one or more component, and to adjust the pressure levels generated at the servovalve current limits by adjustment of the apparatus. Furthermore, it is not necessary to provide additional sources of electrical power in order to drive the apparatus.

Figure 1B:
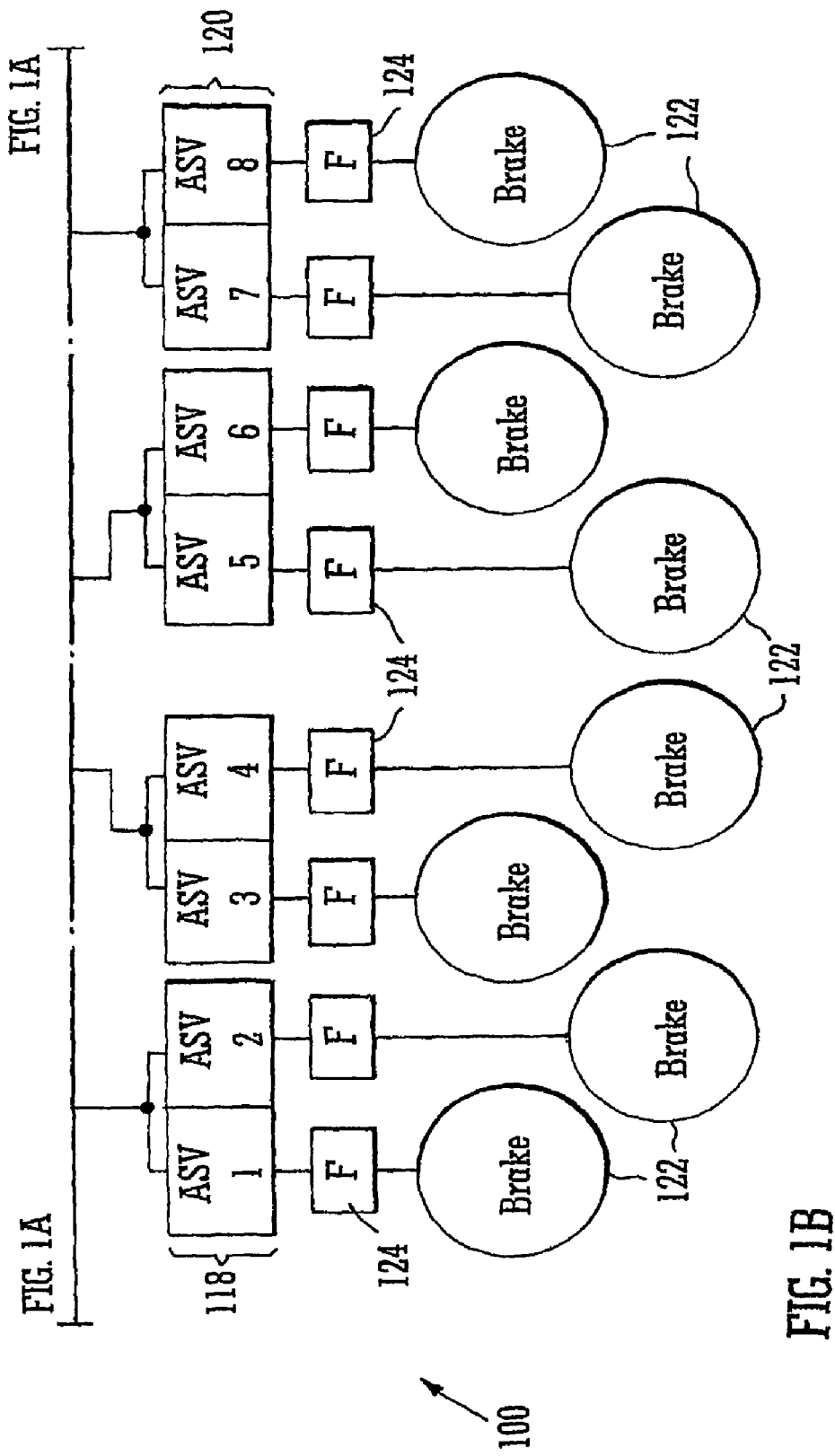

At least one embodiment of the invention will now be described, in a non-limiting manner by way of example only and with reference to the following drawings, in which:

FIG. 1 is a schematic diagram of a braking system comprising an apparatus constituting an embodiment of the invention; and FIGS. 2A to 2D are schematic diagrams of signal and pressure profiles.

Referring to FIG. 1, a braking system 100 comprises a source of hydraulic pressure 102 coupled to a Shut-Off Valve (SOV) 104, the SOV 104 being coupled to a Pressure Control Unit (PCU) 106. The PCU 106 comprises a suitably programmed processing unit (not shown) coupled to a Utility Systems Management System (USMS) 110 via an input 108. However, it should be appreciated that the programmed processing unit can be replaced by other electronic circuitry and/or software. A hydraulic fluid output port 112 is coupled to a first Brake Metering Valve (BMV) 114 and a second BMV 116 by a brake systems hydraulic line 113, the first and second BMVs 114, 116 being coupled to a first set of Anti-Skid Valves (ASVs) 118 and a second set of ASVs 120, respectively. Each ASV 120 is coupled to a corresponding brake assembly 122 via a respective hydraulic fuse 124.

The PCU 106 comprises an Electronic Control Unit (ECU) 126 having an input constituting the input 108 of the PCU 106, and an output coupled to an input of a Pressure Control Servovalve (PCS) 128. The PCS 128 has an input port 130, constituting a hydraulic fluid input port of the PCU 106, and an output port constituting the hydraulic fluid output port 112.

In this example, the ECU 126 and the PCS 128 are formed as a single unit, namely the PCU 106. However, it should be appreciated that the ECU 126 and PCS 128 can be provided as separate units.

In operation (FIG. 2), a braking demand originates, for example, from a pilot. The braking demand is translated into an electrical braking demand signal. The braking demand signal is received by the USMS 110 in addition to other signals representative of factors pertinent to braking, for example: aircraft weight and/or speed. In this respect, the USMS 110 executes a number of algorithms in order to generate a brake trigger signal 200 (FIG. 2A) that is received by the ECU 126 via the input 108. In this example, the PCU 106 derives electrical power from the brake trigger signal 200.

Figure 2A:
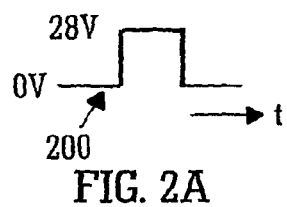
Figure 2B:
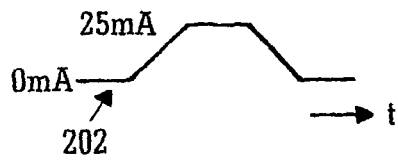
Figure 2D:
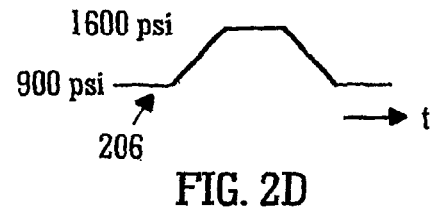
Figure 2C:
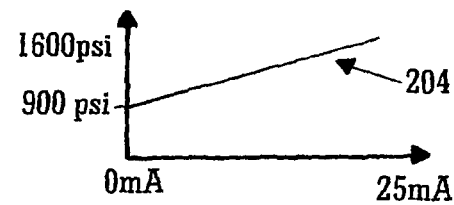

In response to the brake trigger signal 200, the ECU 126 processes the brake trigger signal 200 using a suitable control algorithm stored in the ECU 126 in order to generate a brake pressure demand signal 202 (FIG. 2B) that is received by the PCS 128. Upon receiving the brake pressure demand signal 202, the PCS 128 actuates in accordance with the brake pressure demand signal 202 to apply pressure to the brake system hydraulic line 113 via the output port 112; the pressure profile applied to the braking system hydraulic line 113 follows a predetermined pressure vs. electrical input signal profile 204 (FIG. 2C) of the PCS 128 to yield a brake pressure 206 (FIG. 2D).

Consequently, the brake assemblies 202 effect braking to slow the aircraft within acceptable mechanical parameters of the airframe of the aircraft, thereby avoiding compromising integrity of the airframe.

If desired, the profile of the brake pressure demand signal 202, and hence the profile of the brake pressure 206, can be easily modified by re-programming the ECU 126 and/or modifying at least one component of the ECU 126.

In this example, the ECU 126 is programmed so that, irrespective of the brake demand made by the pilot, the translation of the brake demand by the pilot into the brake pressure 206 is overridden, when necessary, by the ECU 126 in order to avoid the profile of the brake pressure 206 deviating outside, or crossing one or more threshold corresponding to, predetermined pressure profile limits, thereby maintaining airframe integrity if the pilot issues an unacceptable braking demand.

The invention claimed is:

1. An aircraft braking system comprising a braking assembly actuable by hydraulic fluid supplied by a hydraulic pressure source and a control apparatus disposed upstream of the braking assembly for receiving hydraulic fluid from the hydraulic pressure source and providing a controlled hydraulic output to the braking assembly, said control apparatus comprising:

a valve responsive to electrical control signals; and an electrical control operatively connected with said valve for providing said electrical control signals to the valve in response to received braking demand signals provided by a user, said electrical control being arranged to issue electrical control signals that cause said valve to operate to provide said controlled hydraulic output to the braking assembly, which controlled hydraulic output does not exceed a predetermined pressure profile limit irrespective of braking demand signals received by said electric control;

wherein said electrical control is an open loop control that provides said electrical control signals without feedback concerning braking torque occasioned by the controlled hydraulic output.

2. An aircraft braking system as claimed in claim 1, wherein said valve is a servovalve.

3. An aircraft braking system as claimed in claim 1, wherein said electrical control comprises an electronic control unit.

4. An aircraft braking system as claimed in claim 3, wherein said electronic control unit comprises a programmable processor and said predetermined pressure profile limit is determined by airframe parameters of an aircraft, said processor being programmable to permit programming of respective predetermined pressure profile limits within acceptable mechanical parameters of the airframes of different aircraft.

5. An aircraft braking system as claimed in claim 1, wherein said electrical control is an open loop control that provides said electrical control signals without feedback.

6. An aircraft braking system as claimed in claim 1, wherein said electrical control is an open loop control that provides said electrical control signals without feedback concerning the controlled hydraulic output.

7. An aircraft system as claimed in claim 1, wherein at least one of said electrical control and said valve is powered by said braking demand signals.

8. An aircraft braking system as claimed in claim 1, wherein said braking assembly comprises carbon-carbon composite friction surfaces.

9. An aircraft braking system as claimed in claim 1, further comprising a first Brake Metering Valve and a second Brake Metering Valve, both Brake Metering valves being disposed downstream of the control apparatus and upstream of the braking assembly.

10. An aircraft braking system as claimed in claim 8, further comprising a first set of Anti-Skid Valves and a second set of Anti-Skid Valves, each set of anti-skid valves being coupled to the first Brake Metering Valve and the second Brake Metering Valve, respectively, wherein both sets of Anti-Skid Valves are disposed downstream of the respective Brake Metering Valve and upstream of the braking assembly.

11. An aircraft braking system as claimed in claim 9, wherein each Anti-Skid Valve of both the first set of Anti-Skid Valves and the second set of Anti-Skid Valves is coupled to the corresponding brake assembly via a respective hydraulic fuse.

12. An aircraft braking system as claimed in claim 1, further comprising a first set of Anti-Skid Valves and a second set of Anti-Skid Valves, wherein both sets of Anti-Skid Valves are disposed downstream of the control apparatus and upstream of the braking assembly.

13. An aircraft braking system as claimed in claim 11, wherein each Anti-Skid Valve of both the first set of Anti-Skid Valves and the second set of Anti-Skid Valves is coupled to the corresponding brake assembly via a respective hydraulic fuse.

14. An aircraft braking system as claimed in claim 1, wherein said electrical control comprises software.

15. An aircraft fitted with an aircraft braking system as claimed in claim 1.

* * * * *